US012745696B2

(12) United States Patent
Bird et al.

(10) Patent No.: US 12,745,696 B2
(45) Date of Patent: Sep. 29, 2026

(54) YIELD DETERMINATION SYSTEM FOR A VEHICLE

(71) Applicants: CNH Industrial America LLC, New Holland, PA (US); CNH Industrial Belgium N.V., Zedelgem (BE)

(72) Inventors: Glenn M. Bird, Ephrata, PA (US); Jonathan Eaby, Lancaster, PA (US); Grant Garber, Strasburg, PA (US); Geert Mortier, Ghent (BE); Shawn O'Neal, Laurel, DE (US); Kevin M. Smith, Narvon, PA (US)

(73) Assignees: CNH Industrial America LLC, New Holland, PA (US); CNH Industrial Belgium N.V., Zedelgem (BE)

(*) Notice: Subject to any disclaimer, the term of this patent is extended or adjusted under 35 U.S.C. 154(b) by 578 days.

(21) Appl. No.: 18/331,031

(22) Filed: Jun. 7, 2023

(65) Prior Publication Data

US 2024/0407286 A1 Dec. 12, 2024

(51) Int. Cl.
*A01D 34/00* (2006.01)
*A01D 43/10* (2006.01)

(52) U.S. Cl.
CPC .......... *A01D 34/006* (2013.01); *A01D 43/105* (2013.01)

(58) Field of Classification Search
CPC ................ A01D 34/006; A01D 41/127; A01D 41/1271; A01D 41/141; A01D 43/105
See application file for complete search history.

(56) References Cited

U.S. PATENT DOCUMENTS

| | | | | |
|---|---|---|---|---|
| 6,185,990 | B1 | 2/2001 | Missotten et al. | |
| 10,295,703 | B2 | 5/2019 | Dybro et al. | |
| 11,178,818 | B2 * | 11/2021 | Brammeier | G05D 1/0212 |
| 11,744,182 | B2 * | 9/2023 | Carlson | A01D 41/1272 56/36 |
| 2009/0249757 | A1 * | 10/2009 | Diederich, Jr. | A01D 61/004 56/6 |
| 2013/0152534 | A1 * | 6/2013 | Clark | A01D 41/127 56/10.2 B |
| 2013/0160414 | A1 * | 6/2013 | Robert | A01D 43/00 56/157 |

(Continued)

FOREIGN PATENT DOCUMENTS

DE 10315226 B4 3/2007

OTHER PUBLICATIONS

SDSU Paper—Guide to Yield Monitoring Systems (Year: 2023).*
Precision Agriculture: Yield Monitors—Univ. of Missouri (Year: 1998).*

*Primary Examiner* — Fadey S. Jabr
*Assistant Examiner* — Ashutosh Pande
(74) *Attorney, Agent, or Firm* — Foley & Lardner LLP

(57) ABSTRACT

A method of determining a crop yield of a field harvested by a windrower includes receiving, from a header sensor, header data indicative of a load experienced by a header of the windrower, the header including a cutter configured to cut plant material and a conditioning system configured to condition the plant material. The method further includes receiving, from a location sensor, location data indicative of a location of the windrower, and determining the crop yield at the location of the windrower based on the header data and the location data.

20 Claims, 7 Drawing Sheets

(56) References Cited

U.S. PATENT DOCUMENTS

| | | | | |
|---|---|---|---|---|
| 2014/0144116 | A1* | 5/2014 | Kraus | A01D 41/14<br>56/10.2 H |
| 2015/0327440 | A1* | 11/2015 | Dybro | A01D 75/00<br>73/862.541 |
| 2016/0021820 | A1* | 1/2016 | Kraus | A01D 41/1274<br>56/10.2 G |
| 2016/0037720 | A1* | 2/2016 | Koch | A01D 41/1272<br>701/33.7 |
| 2016/0084987 | A1* | 3/2016 | Dybro | G01V 99/00<br>702/5 |
| 2016/0338263 | A1* | 11/2016 | Dybro | A01D 41/141 |
| 2017/0115862 | A1* | 4/2017 | Stratton | A01D 41/127 |
| 2017/0164554 | A1* | 6/2017 | Roberts | A01D 41/06 |
| 2018/0120133 | A1* | 5/2018 | Blank | G01D 18/002 |
| 2018/0122020 | A1* | 5/2018 | Blank | A01D 41/127 |
| 2018/0325029 | A1* | 11/2018 | Rotole | A01D 57/26 |
| 2018/0325031 | A1* | 11/2018 | Rotole | A01D 43/102 |
| 2019/0110394 | A1* | 4/2019 | VanNahmen | A01D 34/006 |
| 2020/0008350 | A1* | 1/2020 | Borsdorf | A01D 61/02 |
| 2020/0057968 | A1* | 2/2020 | Koob | G06Q 50/02 |
| 2020/0163279 | A1* | 5/2020 | Fries | A01D 61/002 |
| 2022/0210972 | A1* | 7/2022 | Fay, II | A01D 41/1275 |
| 2022/0232770 | A1* | 7/2022 | Yanke | A01D 41/127 |
| 2023/0038553 | A1* | 2/2023 | Steidinger | A01D 82/00 |
| 2023/0135915 | A1* | 5/2023 | Cleodolphi | A01D 45/10<br>56/10.2 A |
| 2023/0139169 | A1* | 5/2023 | Cleodolphi | A01D 41/127<br>701/50 |
| 2023/0142286 | A1* | 5/2023 | Morris | A01D 41/127<br>701/50 |
| 2023/0243693 | A1* | 8/2023 | McClelland | G01G 19/12<br>414/507 |
| 2023/0292647 | A1* | 9/2023 | Bainbridge | G06T 7/0016<br>702/2 |
| 2023/0354746 | A1* | 11/2023 | Roth | A01D 43/08 |
| 2024/0032468 | A1* | 2/2024 | Todderud | A01D 41/127 |
| 2024/0138280 | A1* | 5/2024 | Lovett | A01B 69/008 |
| 2024/0138281 | A1* | 5/2024 | Lovett | G05D 1/246 |
| 2024/0138285 | A1* | 5/2024 | Lovett | A01D 41/1278 |
| 2024/0138297 | A1* | 5/2024 | Stephens | A01D 57/20 |
| 2024/0188496 | A1* | 6/2024 | Somarowthu | G06V 10/764 |
| 2025/0072327 | A1* | 3/2025 | Somarowthu | G06T 7/0002 |

* cited by examiner

YIELD DETERMINATION SYSTEM FOR A VEHICLE

BACKGROUND

The present disclosure relates generally to vehicles. More specifically, the present disclosure relates to vehicles with agricultural applications.

Certain agricultural vehicles, such as windrowers, are used to harvest crops, such as hay, alfalfa, or legumes, by cutting the crops in preparation for removal. The crops may have varying yield (e.g., an amount of the crop that is produced in a given area) based on certain factors, such as soil conditions. In order to increase yield, fertilizer may be added to the soil. Accordingly, it is desirable to know which areas have a low yield, such that additional fertilizer can be added to those areas and the overall yield of a field can be maximized.

SUMMARY

One embodiment relates to a method of determining a crop yield of a field harvested by a windrower. The method includes receiving, from a header sensor, header data indicative of a load experienced by a header of the windrower, the header including a cutter configured to cut plant material and a conditioning system configured to condition the plant material. The method further includes receiving, from a location sensor, location data indicative of a location of the windrower, and determining the crop yield at the location of the windrower based on the header data and the location data.

Another embodiment relates to a non-transitory computer-readable medium having instructions stored thereon that, when executed by one or more processors, cause the one or more processors to implement operations. The operations include receiving, from a mower sensor, mower data indicative of an overall load on a mower of a windrower, the mower including a cutter configured to cut plant material, an auger configured to collect plant material, and a conditioning system configured to condition the plant material. The operations further include receiving, from a drive sensor, drive data indicative of a load on a drive motor configured to propel the windrower, receiving, from a location sensor, location data indicative of a location of the windrower, receiving, from a user interface, a user input describing at least one of a configuration of the windrower or a characteristic of a crop being harvested by the windrower, determining, based on the mower data and the drive data, a crop yield of the crop being harvested by the windrower, adjusting the determined crop yield based on the user input, and generating a yield map of a field based on the adjusted crop yield and the location data.

Still another embodiment relates to a farming system. The farming system includes a windrower and a controller. The windrower includes a chassis, a tractive element coupled to the chassis, a drive motor configured to drive the tractive element to propel the windrower, a drive sensor configured to provide drive data indicative of a load on the drive motor, and a header coupled to the chassis. The header includes a rotating disc configured to cut plant material, an auger configured to collect the plant material, a roller configured to condition the plant material, and a header motor configured to drive the rotating disc, the auger, and the roller. The windrower further includes a header sensor configured to provide header data indicative of a load on the header motor and a location sensor configured to provide location data indicative of a current location of the windrower. The controller is operatively coupled to the drive sensor, the header sensor, and the location sensor. The controller is configured to determine a crop yield at a first location based on the drive data, the header data, and the location data and determine a crop yield at a second location based on the drive data, the header data, and the location data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle system of the present disclosure facilitates determining crop yield. The vehicle system includes a windrower including a header that cuts, collects, and conditions (e.g., pulverizes) plant material. As crop yield increases, the rate at which plant material enters the header increases, loading the header and drive motors of the windrower. The windrower includes sensors that measure the load on the header and the vehicle driveline. Based on this sensor data, a controller calculates a crop yield, and associates that calculated crop yield with the location where the sensor data was captured. The controller my revise the calculated crop yield based on one or more factors, such as the configuration of the header or a characteristic of the crop that is being harvested. Using the determined crop yields and the corresponding locations, the controller generates a yield map illustrating the crop yield at various locations throughout a field. The controller may also use the determined crop yield to provide suggestions for improving crop yield, such as adding fertilizer or water to low yield areas. The controller may use the determined crop yield to predict an amount of resources (e.g., seeds, fertilizer, vehicles, manpower, money, etc.) required to farm the crop in a given field, an amount of crop that will be harvested, and a corresponding profitability of the operation.

Overall Vehicle

Figure 1:
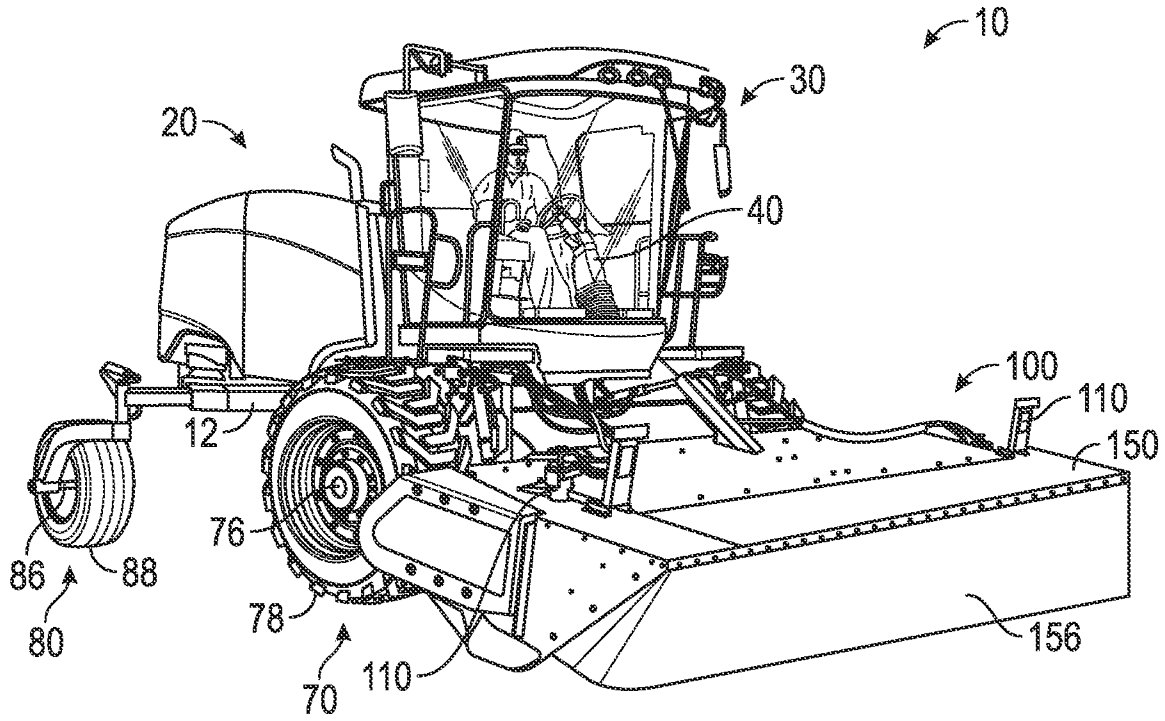
FIG. 1 is a perspective view of a vehicle, according to an exemplary embodiment.
Figure 2:
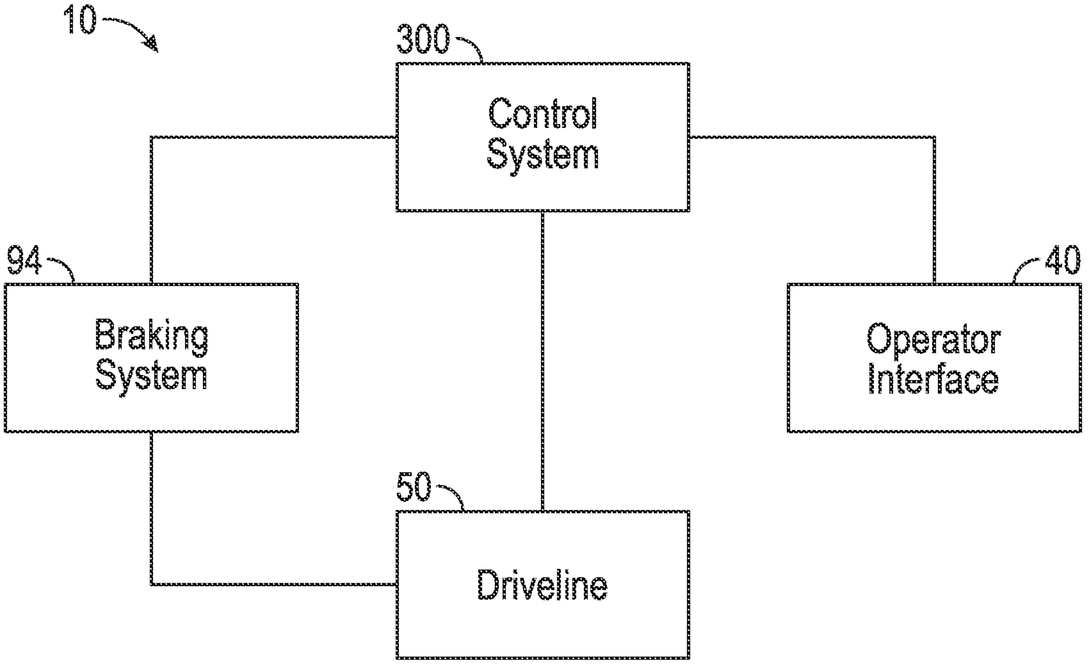
FIG. 2 is a schematic block diagram of the vehicle of FIG. 1, according to an exemplary embodiment.
Figure 3:
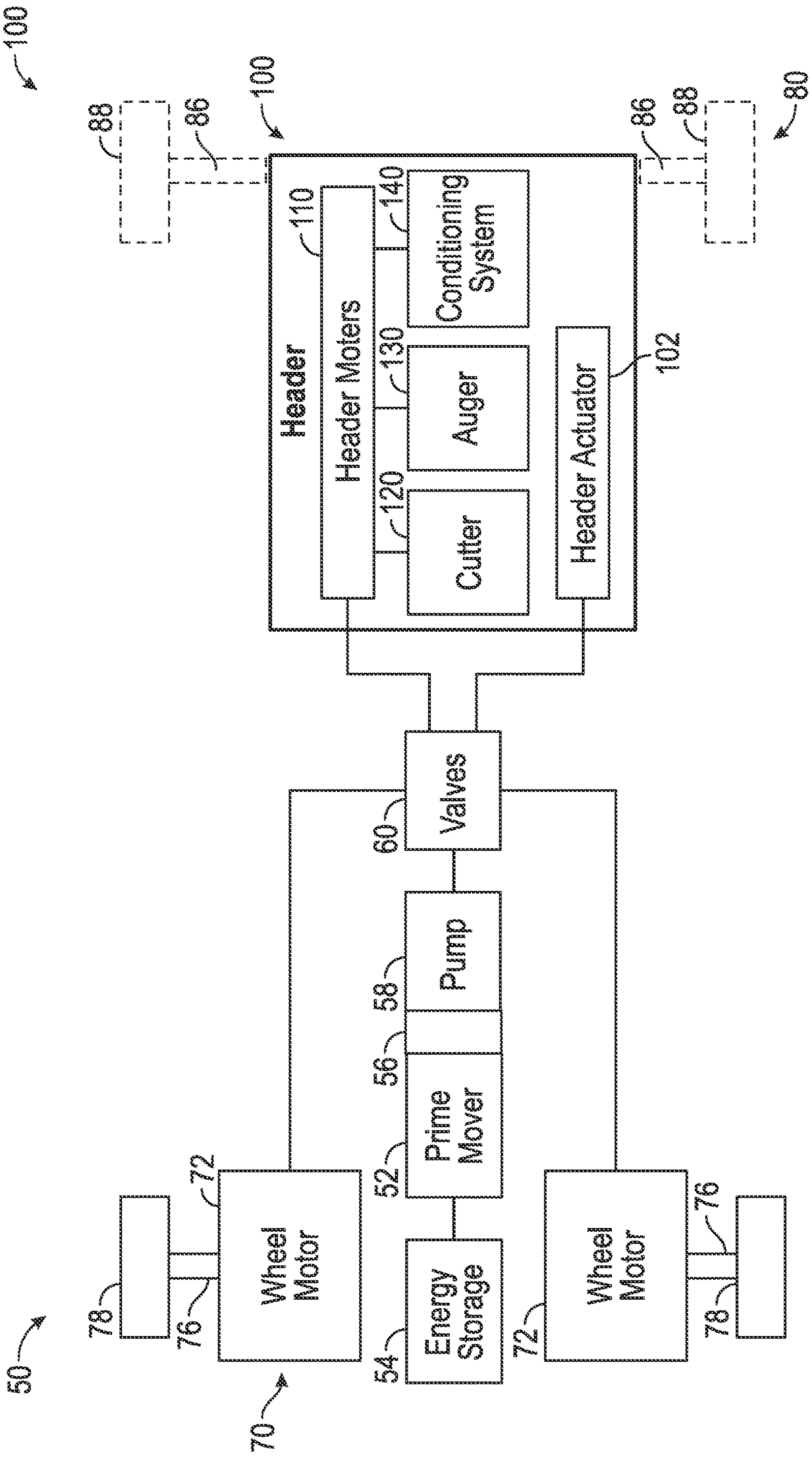
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 94, coupled to one or more components of the driveline 50 to facilitate selectively braking the one or more components of the driveline 50; and a vehicle control system or vehicle system, shown as control system 300, coupled to the operator interface 40, the driveline 50, and the braking system 94. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. As shown in FIG. 1, the vehicle 10 is an agricultural machine, and more specifically a windrower. In other embodiments, the off-road machine or vehicle is an agricultural machine or vehicle such as a tractor, a telehandler, a front loader, a combine harvester, a grape harvester, a forage harvester, a sprayer vehicle, and/or another type of agricultural machine or vehicle. In other embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In other embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a hydraulic pump or source of pressurized fluid, shown as pump 58; one or more flow control devices, shown as valves 60; a first tractive assembly, shown as front tractive assembly 70; and a second tractive assembly, shown as rear tractive assembly 80. The transmission 56 couples an output of the prime mover 52 to the pump 58. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the pump 58. In response to receiving a mechanical energy input, the pump 58 provides a flow of pressurized fluid (e.g., hydraulic oil) to the valves 60. By way of example, the pump 58 may receive fluid from a low pressure source (e.g., a reservoir) and provides the fluid at an elevated pressure. The valves 60 control the flow of the pressurized fluid throughout the vehicle 61. The valves 60 may control the flow rate, flow direction, and/or pressure of the fluid. The valves 60 may include actively controlled valves (e.g., solenoid valves, directional control valves, etc.) and/or passive valves (e.g., check valves, pressure relief valves, etc.).

The front tractive assembly 70 includes a pair of hydraulic motors or drive motors, shown as wheel motors 72. Each wheel motor 72 is coupled to a first axle, shown front axle 76, which is in turn coupled to a tractive element, shown as front tractive element 78. Each wheel motor 72 is fluidly coupled to the valves 60, such that the valves 60 provide pressurized fluid to the wheel motors 72. In response, the wheel motors 72 drive rotation of the front tractive elements 78. The valves 60 may drive the wheel motors 72 independently. By way of example, the valves 60 may drive both wheel motors 72 at the same speed and in the same direction to propel the vehicle 10 straight (e.g., forward or backward). By way of another example, the valves 60 may drive the wheel motors 72 differently (e.g., in different directions, at different speeds, etc.) to cause the vehicle 10 to turn.

As shown in FIGS. 1 and 3, the rear tractive assembly 80 includes a pair of a second axles, shown rear axles 86; and a second pair of tractive elements, shown as rear tractive elements 88, each coupled to one of the rear axles 86. As shown in FIG. 1, the rear axles 86 and the rear tractive elements 88 are configured as freely-rotating casters. Accordingly, the rear tractive elements 88 permit the front tractive assembly 70 to steer and propel the vehicle 10, such that the vehicle 10 is a front-wheel drive vehicle. In other embodiments, the front tractive assembly 70 and/or the rear tractive assembly 80 are otherwise arranged. By way of example, the rear tractive elements 88 may be driven by a set of wheel motors. By way of another example, the front tractive assembly 70 and/or the rear tractive assembly 80 may be mechanically driven by the prime mover 52 (e.g., through one or more drive shafts). In some embodiments, the front tractive elements 78 and/or the rear tractive elements 88 are steerable. In some embodiments, the front tractive elements 78 and/or the rear tractive elements 88 are fixed and not steerable.

According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.).

According to an exemplary embodiment, the braking system 94 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 94 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Header

Referring to FIGS. 1, 3, 4, and 5, the vehicle 10 includes a header or mower (e.g., a rotary disc header), shown as header 100. The header 100 is configured to facilitate harvesting of plant material growing within a field or other growing area by cutting through a stem of the plant. The cut plant material may be placed on the ground and allowed to dry for a period of time before being collected. The header 100 may include a conditioning system that crushes the plant material to facilitate drying. The header 100 may be used to harvest a variety of different plants or crops, such as grass, hay, grain, wheat, legumes, alfalfa, or other crops.

As shown in FIG. 1, the header 100 is coupled to the frame 12 and positioned at a front end of the vehicle 10. In other embodiments, the header 100 is positioned directly below the body 20 (e.g., between the front tractive assembly 70 and the rear tractive assembly 80). In yet other embodiments, the header 100 is a trailed implement that extends behind the body 20.

Referring to FIG. 3, the header 100 is powered by the vehicle 10. Specifically, as shown, the valves 60 are fluidly coupled to the header 100, such that the valves 60 supply pressurized fluid to drive the header 100. In other embodiments, the header 100 is mechanically coupled to the prime mover 52 (e.g., by a power take off shaft), such that the header 100 is at least partially powered by rotational mechanical energy received from the prime mover 52. In yet other embodiments, the header 100 is electrically powered, and the vehicle 10 supplies electrical energy to drive operation of the header 100.

The header 100 includes a header actuator (e.g., a linear actuator, a hydraulic cylinder, etc.), shown as header actuator 102, that is fluidly coupled to the valves 60. The header actuator 102 couples the header 100 to the frame 12 and is configured to selectively raise and lower the header 100 relative to the frame 12 (e.g., to control a cut height of the header 100, to raise the header 100 to facilitate travel on a road, etc.). The valves 60 may control operation of the header actuator 102 by either directing fluid to the header actuator 102 and/or by removing fluid from the header actuator 102. The header actuator 102 may be single acting (e.g., lowered by the force of gravity) or double acting (e.g., powered in the raise and lower directions).

The header 100 further includes one or more drivers, shown as header motors 110 (e.g., hydraulic motors, etc.). The header motors 110 are fluidly coupled to the valves 60, such that the valves control operation of the header motors 110. The valves 60 may control the speed of the header motors 110 by varying flow rate of fluid supplied to the header motors 110. The valves 60 may control the torque of the header motors 110 by varying the pressure of the fluid supplied to the header motors 110. In other embodiments, the header motors 110 are otherwise powered (e.g., as electric motors).

The header 100 includes a first subassembly or cutterbar, shown as cutter 120, a second subassembly or collector, shown as auger 130, and a third subassembly or conditioner, shown as conditioning system 140. The cutter 120, the auger 130, and the conditioning system 140 are all powered by the header motors 110. In some embodiments, the header motors 110 are coupled to a gearbox that distributes rotational mechanical energy from the header motors 110 to the cutter 120, the auger 130, and the conditioning system 140. Such a gearbox may control the relative rotational timings of the cutter 120, the auger 130, and/or the conditioning system 140. In other embodiments, one or more of the cutter 120, the auger 130, and the conditioning system 140 are independently driven by one or more header motors 110.

The cutter 120 is configured to cut through the stems of the plant material, separating the plant material from the roots. The auger 130 collects the separated plant material, moving it laterally inward toward a centerline of the header 100. The conditioning system 140 crushes, presses, squeezes, mashes, pulps, pulverizes, or otherwise conditions the plant material to facilitate drying. The crushed material is dispensed from the header 100 onto the ground, where it may be later collected by another vehicle (e.g., a baler). In other embodiments, the auger 130 is omitted, and the plant material passes directly from the cutter 120 to the conditioning system 140.

Figure 4:
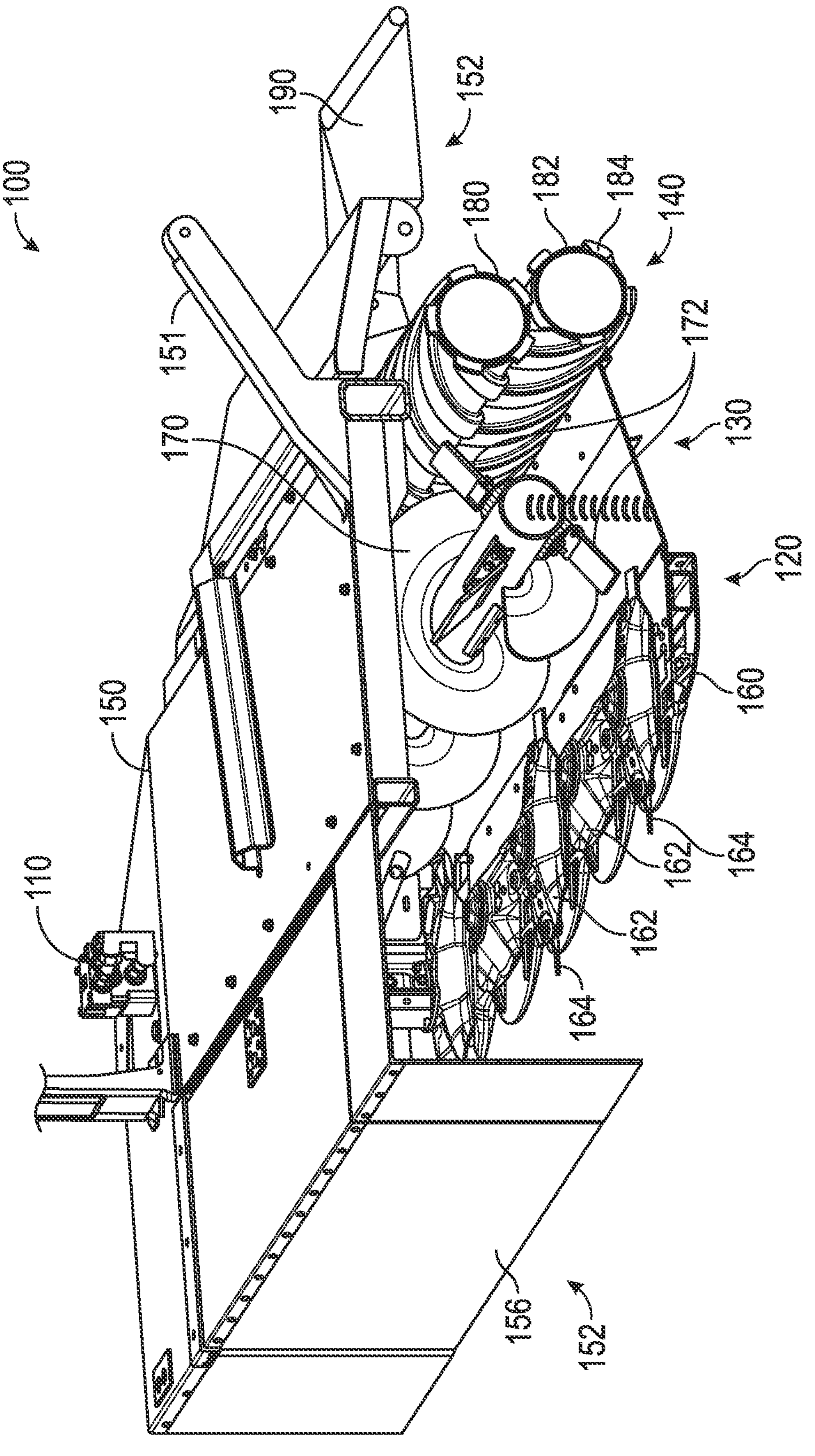
FIG. 4 is a perspective section view of a header of the vehicle of FIG. 1, according to an exemplary embodiment.
Figure 5:
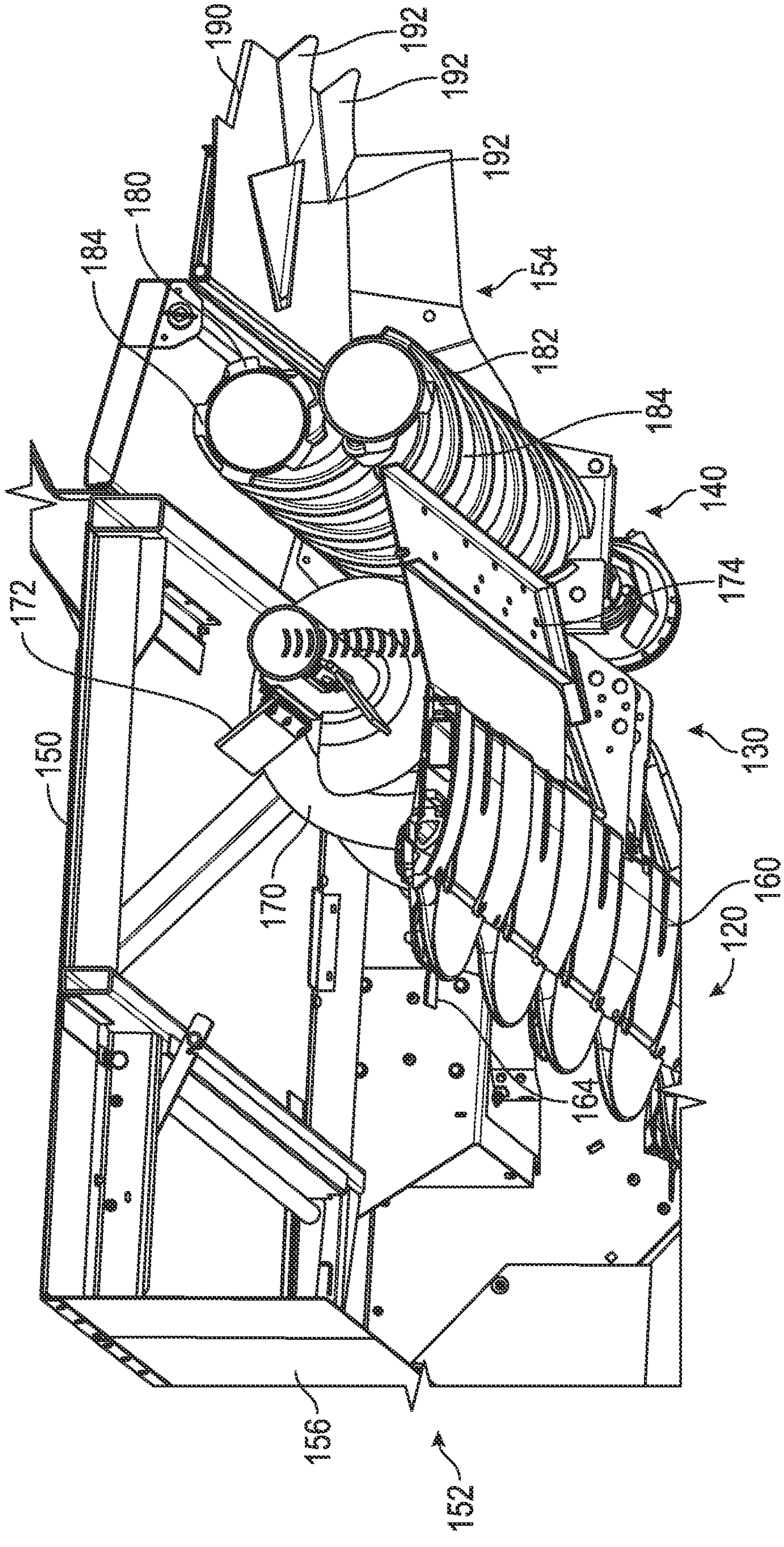
FIG. 5 is another perspective section view of the header of FIG. 4.

Referring to FIGS. 4 and 5, the header 100 is shown according to an exemplary embodiment. The header 100 includes a body, chassis, or frame, shown as housing 150, coupled to the frame 12 of the vehicle 10. The housing 150 may be selectively coupled to the frame 12 (e.g., to facilitate removal of the header 100 for maintenance or to interchange with another implement). The housing 150 includes a projection, shown as support arm 151, that is configured to be coupled to the header actuator 102. The housing 150 supports the other components of the header 100.

The housing 150 defines a flow path for plant material to pass through the header 100. The flow path passes from an inlet 152 positioned at the front of the header 100 to an outlet 154 positioned at a rear end of the header 100. The inlet 152 may be wider than the outlet 154, such that the header 100 collects the plant material into a narrow windrow to facilitate subsequent collection.

A flexible barrier, shown as curtain 156, is coupled a front end of the housing 150. The curtain 156 extends downward from the housing 150 and across the inlet 152. The flexible nature of the curtain 156 permits plant material to enter the inlet 152 but resists debris (e.g., rocks, sticks, etc.) and cut plant material from being ejected through the inlet 152.

As shown in FIGS. 4 and 5, the cutter 120 is configured as a rotary disc cutterbar. The cutter 120 includes a base, frame, or deflector, shown as rock guard 160, that is coupled to the housing 150. The rock guard 160 extends laterally across the header 100 immediately downstream of the inlet 152. The rock guard 160 protects the moving components of the cutter 120 (e.g., the cutting discs 162, the knives 164, etc.) from contact with debris (e.g., rocks, sticks, etc.) on the ground beneath the header 100. The rock guard 160 may also house a power transmission (e.g., a gear train) that distributes rotational mechanical energy throughout the cutter 120.

The cutter 120 further includes a series of cutting elements, shown as cutting discs 162, that are positioned at regular intervals along a length of the rock guard 160. Each cutting disc 162 is rotatably coupled to the rock guard 160 and configured to rotate about a substantially vertical axis. Each cutting disc 162 includes one or more cutting elements, shown as knives 164, positioned along a circumference of the cutting disc 162. The cutting discs 162 are all coupled to the header motors 110 (e.g., directly, by a power transmission, etc.) and are driven to rotate by the header motors 110. As the cutting discs 162 rotate, the knives 164 move horizontally, striking plant matter that enters the inlet 152 and shearing the stems of the plants. The sheared plant matter then falls over the cutter 120 and engages the auger 130.

The auger 130 is positioned downstream of the cutter 120. The auger 130 is rotatably coupled to the housing 150 and configured to rotate about a laterally-extending, horizontal axis. The auger 130 is coupled to the header motors 110 (e.g., directly, by a power transmission, etc.) and driven to rotate by the header motors 110. The auger 130 includes a pair of helical elements 170 extending radially outward from a central shaft. The helical elements 170 are laterally offset from one another. A series of paddles 172 are positioned between the helical elements 170. The helical elements 170 have opposing helical pitches. Accordingly, as the auger 130 rotates, the helical elements 170 direct plant matter laterally inward, toward the center of the auger 130. Due to the opposing helical pitches of the helical elements 170, plant matter that contacts the first helical element 170 is directed in a first direction, and plant matter that contacts the second helical element 170 is directed in an opposing second direction. Once the plant matter is between the helical elements 170, the paddles 172 engage the plant matter and direct the plant matter rearward. A panel or shield, shown as floor panel 174, extends beneath the auger 130 and between the cutter 120 and the conditioning system 140. The plant material is contained between the housing 150 and the floor panel 174, preventing the plant material from spilling out of the header 100.

The conditioning system 140 is positioned downstream of the auger 130. As shown in FIGS. 4 and 5, the conditioning system 140 includes a pair of conditioning rollers, shown as top roller 180 and bottom roller 182, rotatably coupled to the housing 150. The rollers 180, 182 each extend laterally across the housing 150, substantially parallel to one another. The rollers 180, 182 are coupled to the header motors 110 (e.g., directly, by a power transmission, etc.) and are driven to rotate in opposing directions by the header motors 110. By way of example, the top roller 180 may rotate counter clockwise as shown in FIG. 5, and the bottom roller 182 may rotate clockwise. A gap is formed between the top roller 180 and the bottom roller 182, permitting plant matter to pass between the top roller 180 and the bottom roller 182. Due to the opposing rotational directions of the top roller 180 and the bottom roller 182, the rollers 180, 182 draw the plant material through the gap, compressing the plant material between the rollers 180, 182.

In some embodiments, the distance between the top roller 180 and the bottom roller 182 is variable. By way of example, the bottom roller 182 may have a fixed vertical position, and the top roller 180 may have an adjustable vertical position. The top roller 180 may be biased toward the bottom roller 182 (e.g., by a set of springs), such that the rollers 180, 182 are held against one another by a biasing force. In other embodiments, the vertical positions of one or more of the rollers 180, 182 are manually adjustable by an operator. By adjusting the size of the gap and/or the biasing force between the motors, the extent of the conditioning (e.g., how thoroughly the plant material is pulverized) can be adjusted.

The conditioning system 140 may be configured with a variety of different conditioning elements. In some such embodiments, one conditioning element or set of conditioning elements may be removed and replaced with another conditioning element or set of conditioning elements. In various embodiments, the top roller 180 and the bottom roller 182 may be made from a variety of different materials such as steel or rubber. As shown in FIG. 5, the top roller 180 and the bottom roller 182 each include a helical protrusion, shown as protrusion 184, that extends radially outward. The protrusions 184 intermesh, crimping the plant material between the protrusions 184 for additional conditioning. In other embodiments, the protrusions 184 are omitted, and the rollers 180, 182 each have a smooth cylindrical outer surface.

Figure 6:
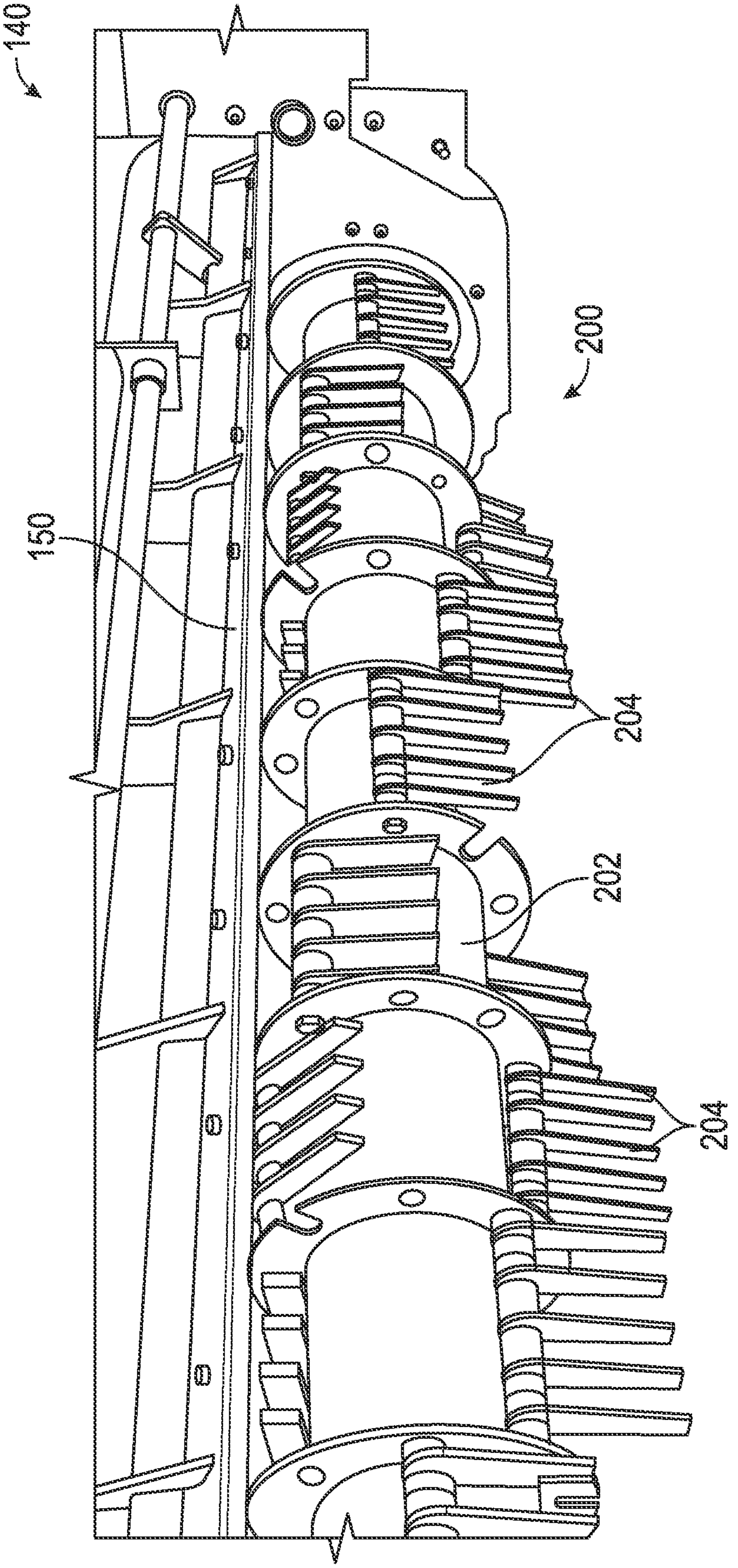
FIG. 6 is a perspective view of a flail roller for use with the header of FIG. 4, according to an exemplary embodiment.

FIG. 6 illustrates another type of conditioning element usable with the conditioning system 140. In the embodiment of FIG. 6, the rollers 180, 182 are omitted and replaced with a flail roller 200. The flail roller 200 includes a base roller 202 and a series of flail elements, shown as tines 204. The tines 204 are rotatably coupled to the base roller 202. Each tine 204 is rotatable about an axis that is offset from an axis of rotation of the base roller 202. In operation, the tines 204 are forced to extend outward by the rotation of the base roller 202. As the tines 204 come into contact with plant material, the tines momentum of the tines 204 causes the tines 204 to crush the plant material.

Referring again to FIGS. 4 and 5, the header 100 includes a rotatable panel, shown as swathe baffle 190, that is positioned downstream of the outlet 154. The swathe baffle 190 is positioned above the outlet 154 and directs plant material downward as the plant material leaves the header 100. The swathe baffle 190 is coupled to the housing 150. In some such embodiments, the swathe baffle 190 is rotatably coupled to the housing 150, such that the swathe baffle 190 can rotate about a lateral axis. The position of the swathe baffle 190 may be adjusted (e.g., manually, by an actuator, etc.) to control the downward trajectory of plant material from the header 100. A series of control elements, shown as fins 192, are positioned along an underside of the swathe baffle 190. The fins 192 may be angled relative to the flow of plant material to adjust the trajectory of the plant material (e.g., to bring the plant material laterally toward the center of the header 100).

Control System

Figure 7:
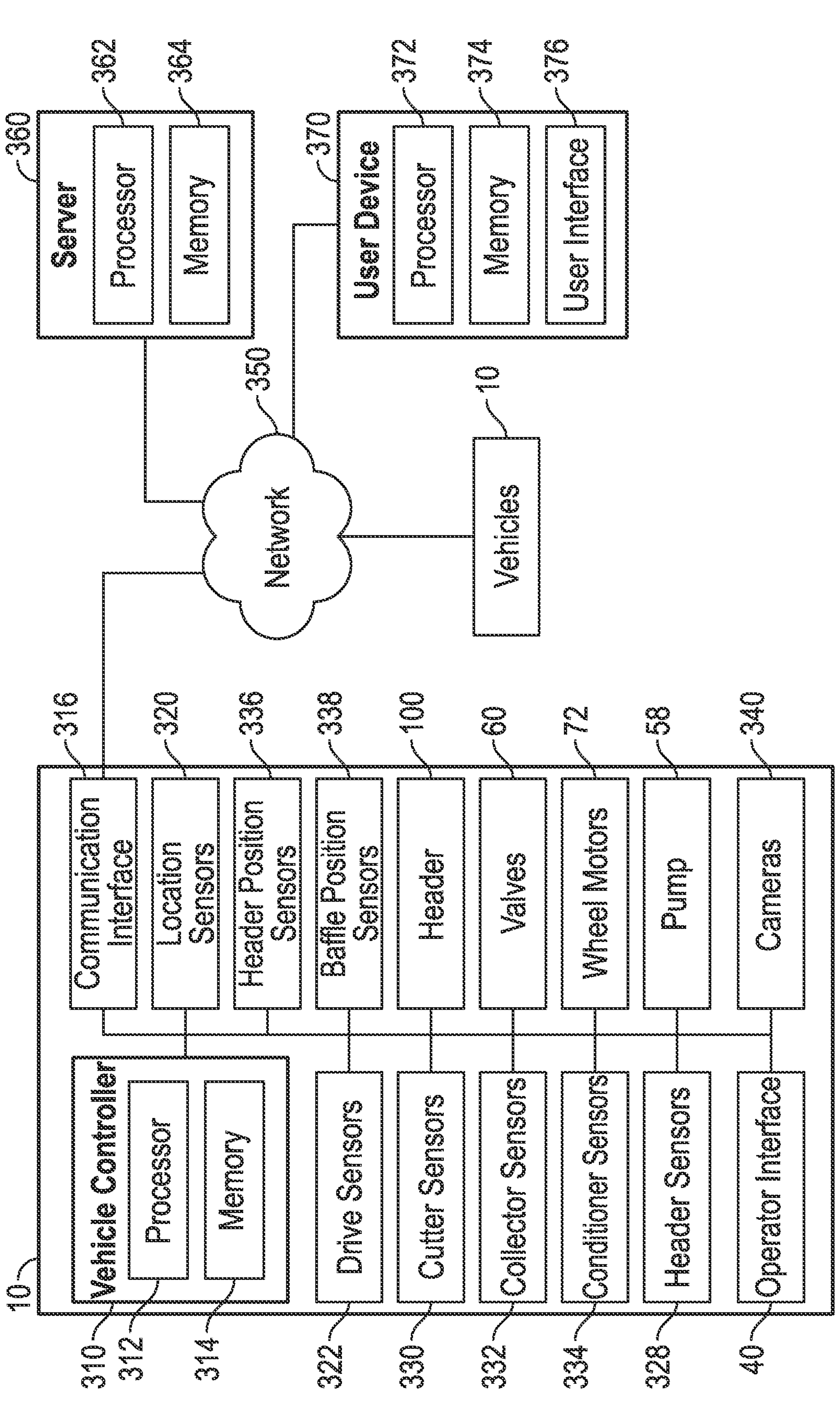
FIG. 7 is a block diagram of a control system including the vehicle of FIG. 1, according to an exemplary embodiment.

Referring to FIG. 7, the control system 300 of the vehicle 10 is shown according to an exemplary embodiment. The control system 300 includes a first processing circuit, shown as vehicle controller 310. The vehicle controller 310 is configured to at least partially control operation of the vehicle 10. The vehicle controller 310 includes a processor 312 and a memory device, shown as memory 314. The memory 314 may store instructions that, when executed by the processor 312, cause the vehicle controller 310 to perform the various processes described herein. The control system 300 further includes a network interface, shown as communication interface 316, that facilitates communication between the vehicle controller 310 and various external elements.

The vehicle controller 310 is operatively coupled to the operator interface 40, the pump 58, the valves 60, the wheel motors 72, and the header 100 (e.g., the header motors 110). The vehicle controller 310 may provide control signals to control operation of the operator interface 40, the pump 58, the valves 60, the wheel motors 72, and/or the header 100. By way of example, the vehicle controller 310 may provide electrical signals, control the valves 60 to adjust flows of hydraulic fluid, vary a displacement of the pump 58, and/or otherwise control components of the vehicle 10.

The vehicle 10 includes one or more sensors, shown as location sensors 320, that indicate a location of the vehicle 10. The location sensors 320 may indicate an absolute location of the vehicle 10 (e.g., a location of the vehicle 10 relative to the Earth). By way of example, the location sensors 320 may include a global positioning system (GPS) that indicates a global position of the vehicle 10. The location sensors 320 may indicate a relative position of the vehicle 10 (e.g., a position of the vehicle 10 relative to a landmark, relative to another vehicle 10, etc.). By way of example, the location sensors 320 may include gyroscopic sensor, accelerometers, ultrasonic distance sensors, cameras that identify positions of visual identifiers, rotation sensors that measure the distance travelled by one or more of the front tractive elements 78, or other types of sensors. The location sensors 320 may indicate a ground speed of vehicle 10 (e.g., based on a change in measured location over time, based on a rotational speed of a tractive element, etc.).

The vehicle 10 includes a variety of sensors measure conditions related to the power consumed by various systems of the vehicle 10. The vehicle controller 310 may utilize the measured data to determine the load on each component. By way of example, the vehicle controller 310 may utilize the measurements provided by each sensor to determine the load on the wheel motors 72 and/or the header 100.

The vehicle 10 includes one or more propulsion sensors or wheel sensors, shown as drive sensors 322. The drive sensors 322 provide measurement data related to or indicative of a power required to propel the vehicle 10. By way of example, the drive sensors 322 may measure rotational speeds of the front tractive elements 78. This may be measured directly (e.g., using an encoder or other rotation sensor) or indirectly (e.g., by measuring a flow rate of fluid delivered to one of the wheel motors 72). By way of another example, the drive sensors 322 may measure a force or torque required to drive the front tractive elements 78. This may be measured directly (e.g., by placing a strain gauge or torque transducer on one of the front axles 76, etc.) or indirectly (e.g., by measuring a pressure of the fluid being supplied to the wheel motors 72, etc.). Based on the speed of the front tractive elements 78 and/or the torque required to drive the front tractive elements 78, the power being delivered to the front tractive elements 78 by the wheel motors 72 may be calculated. Correlations between the conditions measured by the drive sensors 322 and the power supplied by the wheel motors 72 to propel the vehicle 10 may be predetermined and stored in the memory 314.

In some embodiments, the vehicle 10 includes one or more sensors that provide data indicative of a load on the header 100. The sensors may measure the overall load on the header 100 (e.g., by measuring the fluid power supplied to the header 100) or may measure the load on individual components of the header 100 (e.g., the cutter 120, the auger 130, the conditioning system 140, etc.). Generally, the sensors may measure a speed at which the header 100 operates (e.g., the speed of a component, the flow rate of fluid to the header 100, etc.) and/or a force or torque required to drive the header 100 (e.g., the torque on a roller, the pressure of the fluid supplied to the header 100, etc.).

In some embodiments, the vehicle 10 includes one or more header load sensors, shown as header sensors 328. The header sensors 328 provide measurement data related to or indicative of a power required to drive the header 100. The header sensors 328 may indicate the overall load on the header 100 (e.g., the overall power required to drive the header 100). By way of example, the header sensors 328 may measure an operating speed of the header 100 (e.g., by measuring a flow rate of fluid delivered to the header motors 110). By way of another example, the header sensors 328 may measure a force required to drive the header 100 (e.g., by measuring the pressure of the fluid delivered to the header motors 110, etc.). Based on the speed of the speed of the header 100 and/or the force required to drive the header 100, the power being delivered to the header 100 by the vehicle 10 may be calculated. By way of example, the flow rate and pressure of the fluid supplied to the header motors 110 may be multiplied to calculate the power supplied to the header 100. Correlations between the conditions measured by the header sensors 328 and the power supplied to the header 100 may be predetermined and stored in the memory 314.

The vehicle 10 may include one or more cutter load sensors, shown as cutter sensors 330. The cutter sensors 330 provide measurement data related to or indicative of a power required to drive the cutter 120. By way of example, the cutter sensors 330 may measure rotational speeds of the cutting discs 162. This may be measured directly (e.g., using an encoder or other rotation sensor) or indirectly (e.g., by measuring a flow rate of fluid delivered to one or more of the header motors 110). By way of another example, the cutter sensors 330 may measure a force or torque required to drive the cutter 120. This may be measured directly (e.g., by placing a torque transducer on an input shaft of one or more of the cutting discs 162, etc.) or indirectly (e.g., by measuring a pressure of the fluid being supplied to the header motors 110, etc.). Based on the speed of the cutter 120 and/or the torque required to drive the cutter 120, the power being delivered to the cutter 120 by the header motors 110 may be calculated. Correlations between the conditions measured by the cutter sensors 330 and the power supplied to the cutter 120 may be predetermined and stored in the memory 314.

The vehicle 10 may include one or more collector load sensors, shown as collector sensors 332. The collector sensors 332 provide measurement data related to or indicative of a power required to drive the auger 130. By way of example, the collector sensors 332 may measure the rotational speed of the auger 130. This may be measured directly (e.g., using an encoder or other rotation sensor) or indirectly (e.g., by measuring a flow rate of fluid delivered to one or more of the header motors 110). By way of another example, the collector sensors 332 may measure a force or torque required to drive the auger 130. This may be measured directly (e.g., by placing a torque transducer on the auger 130, etc.) or indirectly (e.g., by measuring a pressure of the fluid being supplied to the header motors 110, etc.). Based on the speed of the auger 130 and/or the torque required to drive the auger 130, the power being delivered to the auger 130 by the header motors 110 may be calculated. Correlations between the conditions measured by the collector sensors 332 and the power supplied to the auger 130 may be predetermined and stored in the memory 314.

The vehicle 10 may include one or more conditioning system load sensors, shown as conditioner sensors 334. The conditioner sensors 334 provide measurement data related to or indicative of a power required to drive the conditioning system 140 (e.g., the top roller 180, the bottom roller 182, the flail roller 200, etc.). By way of example, the conditioner sensors 334 may measure rotational speeds of one or more rollers. This may be measured directly (e.g., using an encoder or other rotation sensor) or indirectly (e.g., by measuring a flow rate of fluid delivered to one or more of the header motors 110). In some embodiments, a rotational speed of only one of the rollers 180, 182 is measured. By way of example, the top roller 180 may be floating (e.g., free to move vertically) and biased toward the bottom roller 182 (e.g., by gravity and/or springs). In this case, the top roller 180 may be constantly in engagement with plant material when the plant material passes through the conditioning system 140, such that the top roller 180 provides an accurate measurement of the speed at which plant material moves through the conditioning system 140. By way of another example, the top roller 180 may be free spinning, and the bottom roller 182 may be driven by the header motors 110. In such an embodiment, the rotational speed of the top roller 180 may provide a direct indication of the speed at which plant material is flowing through the header 100. By way of another example, the conditioner sensors 334 may measure a force or torque required to drive the conditioning system 140. This may be measured directly (e.g., by placing a torque transducer on the top roller 180, the bottom roller 182, and/or the flail roller 200, etc.) or indirectly (e.g., by measuring a pressure of the fluid being supplied to the header motors 110, etc.). Based on the speed of the conditioning system 140 and/or the torque required to drive the conditioning system 140, the power being delivered to the conditioning system 140 by the header motors 110 may be calculated. Correlations between the conditions measured by the conditioner sensors 334 and the power supplied to the conditioning system 140 may be predetermined and stored in the memory 314.

The vehicle 10 further includes one or more sensors, shown as header position sensors 336, that indicate a position of the header 100 relative to the frame 12. By way of example, the header position sensors 336 may indicate a vertical position of the header 100 (e.g., relative to the ground). By way of another example, the header 100 may be pivotally coupled to the frame 12, and the header position sensors 336 may indicate an angular position of the header 100 (e.g., relative to the frame 12, relative to the direction of gravity, etc.). In one such example, the header 100 pivots about a horizontal axis, such that rotation of the header 100 adjusts a cutting height of the header 100. In some embodiments, the header position sensors 336 indicate a current length of the header actuator 102 (e.g., using a linear potentiometer or encoder).

The vehicle 10 further includes one or more sensors, shown as baffle position sensors 338, that indicate a position of the swathe baffle 190. By way of example, the baffle position sensors 338 may indicate an angular orientation of the swathe baffle 190 relative to the housing 150. In some embodiments, the baffle position sensors 338 include encoders or potentiometers that directly measure the angular position of the swathe baffle 190.

The vehicle 10 further includes one or more image sensors or environment sensors, shown as cameras 340, operatively coupled to the vehicle controller 310. The cameras 340 may be configured to provide image data. In other embodiments, the vehicle 10 additionally or alternatively includes a different type of environment sensor, such as an ultrasonic distance sensor or an infrared time of flight sensor, that indicates a distance between the vehicle 10 and an object in the surrounding environment. In some embodiments, the cameras 340 provide image data indicative of an environment surrounding the vehicle 10. In some embodiments, the cameras 340 provide image data relating to the amount of plant material entering or exiting the header 100. By way of example, the cameras 340 may capture image data of an area forward of the header 100. The area may include a section of plant material that is about to enter the header 100. The vehicle controller 310 may perform image recognition on the image data (e.g., based on a predetermined relationship between an amount of pixels and a real-world distance) to determine a width of the section of plant material about to enter the header 100.

By way of another example, the cameras 340 may provide image data capturing an area behind the header 100. This area may include a windrow of harvested plant material formed by the header 100 of the vehicle 10 as the vehicle 10 travels through a field. The vehicle controller 310 may perform image recognition to determine a size of the windrow (e.g., a width and height of the windrow, a volume of the windrow, etc.). By way of example, the vehicle controller 310 may have a predetermined calibration that correlates a number of pixels captured by a camera with a real-world distance. As the size of the windrow increases, the crop yield increases. Accordingly, based on the image data and the ground speed of the vehicle 10, the vehicle controller 310 may determine the crop yield in real time.

The communication interface 316 may facilitate communication between the vehicle 10 and other devices of the control system 300. By way of example, the communication interface 316 may communicate over a network 350. The network 350 may facilitate communication (e.g., transfer of data) between one or more vehicles 10, servers 360, and/or user devices 370. The devices of the control system 300 may communicate directly with one another, over the network 350, or indirectly through one another (e.g., forming a mesh network).

In some embodiments, the devices of the control system 300 utilize wireless communication. By way of example, the devices may utilize a cellular network, Bluetooth, near field communication (NFC), infrared communication, radio, or other types of wireless communication. In other embodiments, the communication interface 316 utilizes wired communication (e.g., a controller area network (CAN), etc.). In some embodiments, the network 350 includes a cellular network, a local area network, a wide area network, the Internet, and/or other networks.

The server 360 may be positioned remote from the vehicles 10 and positioned to host one or more centralized functions (e.g., for a fleet of the vehicles 10, for a manufacturer of the vehicles 10, etc.). The memory 364 may act as a centralized device for storing and/or processing the data generated by the control system 300. The server 360 includes a processing circuit including a processor 362 and a memory device, shown as memory 364. The memory 364 may store instructions that, when executed by the processor 362, cause the server 360 to perform the various processes described herein. The memory 364 may additionally store data generated by the control system 300.

The user devices 370 facilitate users (e.g., vehicle operators, system managers, customers, etc.) interfacing with the vehicles system. The user devices 370 may include smartphones, tablets, laptop or desktop computers, and/or other devices. The user devices 370 each include a processing circuit including a processor 372 and a memory device, shown as memory 374. The memory 374 may store instructions that, when executed by the processor 372, cause the user device 370 to perform the various processes described herein.

Each user device 370 further includes an input/output device, shown as user interface 376, that facilitates communicating information between the user device 370 and a user. The user interface 376 may include output devices (e.g., displays, lights, speakers, haptic feedback devices, etc.) that facilitate communicating information to a user. The user interface 376 may include input devices (e.g., touchscreens, buttons, switches, microphones, etc.) that facilitate the user communicating information (e.g., commands) to the user device 370.

Any processing described herein may be performed by any of the devices of the control system 300. By way of example, processing described herein as being performed by the vehicle controller 310 of a vehicle 10 may additionally or alternatively be performed by the vehicle controller 310 of another vehicle 10, a server 360, and/or a user device 370. In some embodiments, the processing is distributed across multiple devices, such that one or more vehicle controllers 310, servers 360, and/or user devices 370 cooperate to perform the processing.

Yield Determination

The control system 300 may be configured to utilize various data generated by the control system 300 to determine a crop yield of a field harvested by a vehicle 10. The vehicle controller 310 may report the determined crop yield to a user (e.g., through a graphical user interface). A crop yield may represent an amount of plant material (e.g., a crop) that is produced and harvested in a given area of a field. The crop yield may be represented as an absolute amount (e.g., mass of plant material harvested per unit area, $kg/m^2$) or a relative amount (e.g., by defining high yield areas and low yield areas, based on a scale from 0% to 100%, etc.). It may be desirable to maximize crop yields in order to increase the amount of plant material that can be harvested from a field, facilitating efficient use of land. Crop yields may vary based on a variety of factors, such as soil conditions (e.g., nutrient content, hydration, etc.). Accordingly, by reporting areas of low and high crop yield to a user, the vehicle 10 facilitates the user identifying areas requiring intervention to increase crop yield. For example, the control system 300 may recommend that a user supply additional fertilizer or water to the areas of low crop yield. Accordingly, the control system 300 beneficially facilitates maximizing an overall crop yield of a field that is harvested by the vehicle 10.

Yield data may also be used to predict the overall amount of crop that will be harvested from a given field for that harvest and for future harvests. Based on this prediction, the control system 300 may predict the amount of resources that will be required for farming the crop (e.g., the amount of seeds, water, fertilizer, etc. required to grow the crop, the amount of vehicles required to transport the harvested crop, the amount of fuel that will be required to harvest and transport the crop, etc.). Based on the predicted overall yield, the control system 300 may also predict the amount of revenue that will result from the harvest, and therefore the profitability of the harvest.

Generally, as the crop yield of an area being harvested by a vehicle 10 increases, the load on the vehicle 10 increases, and the amount of power consumed by the vehicle 10 increases. The control system 300 may receive load measurement data indicative of the load on the vehicle 10 (e.g., from the drive sensors 322, the cutter sensors 330, the collector sensors 332, the conditioner sensors 334, etc.). Based on the load measurement data, the control system 300 (e.g., one or more of the vehicle controllers 310, the servers 360, or the user devices 370) may determine an initial crop yield. In order to improve the accuracy of the determination, the control system 300 may apply one or more correction factors (e.g., based on user inputs or other measured data, etc.) to further refine the determined crop yield. The corrected crop yield may be associated with a location where the harvesting took place (e.g., as determined by the location sensors 320). This process may be repeated as the vehicle 10 travels throughout a field, and the control system 300 may compile the determined crop yield and associated locations into a yield map characterizing the field.

A. Load Measurement Data

The control system 300 may receive power measurement data or load measurement data including at least one parameter indicative of a load on the vehicle 10. The load measurement data my directly indicate an amount of power consumed to drive a portion of the vehicle 10, a parameter that may be used to calculate the amount of power consumed to drive a portion of the vehicle, or a parameter that is related to (e.g., is proportionate to, scales with, etc.) the amount of power consumed to drive a portion of the vehicle. By way of example, the load measurement data may include the power required to drive a component, a torque on the component, a force on the component, a stress or strain experienced by the component, a pressure of a fluid used to drive the component (e.g., through a hydraulic motor), or another parameter indicative of the load.

The load measurement data (e.g., drive data) may indicate a load on the wheel motors 72 (e.g., the power required to propel the vehicle 10 or a related parameter). By way of example, the load measurement data may be provided by the drive sensors 322. As the vehicle 10 drives forward, plant material contacts the curtain 156 and passes into the header 100 where the plant material is presented for cutting by the cutter 120. The wheel motors 72 supply the force to move the plant material past the curtain 156. As the amount of plant material in a given area increases, the force required to bring the plant material into the header 100 increases. Accordingly, an increase in the torque on the wheel motors

72, the pressure of the fluid supplied to the wheel motors 72, and/or the power consumed to propel the vehicle 10 may indicate a corresponding increase in yield. Such a parameter may be measured by the drive sensors 322. A relationship between the data from the drive sensors 322 and the yield may be predetermined (e.g., experimentally) and stored by the control system 300 (e.g., in the memory 364, in the memory 314, etc.).

The control system 300 may receive load measurement data (e.g., header data) indicating a load on the header 100 (e.g., an amount of power consumed to drive the header 100 or a related parameter). The load measurement data may be provided by one or more of the header sensors 328, the cutter sensors 330, the collector sensors 332, or the conditioner sensors 334. By way of example, the header sensors 328 may indicate the total amount of power required to drive the header 100, an amount of torque on a component of the header 100 (e.g., the header motors 110), a pressure of a fluid supplied to the header motors 110, or another related parameter. By way of another example, the cutter sensors 330 may indicate the amount of power required to drive the cutter 120 or a related parameter (e.g., a torque driving one of the cutting discs 162), the collector sensors 332 may indicate the amount of power required to drive the augers 130 or a related parameter (e.g., a torque driving the augers 130), and the conditioner sensors 334 may indicate the amount of power required to drive the conditioning system 140 or a related parameter (e.g., a torque driving the bottom roller 182). In such an example, the total load on the header 100 (e.g., the total power required to drive the header 100) may be a function of (e.g., the sum of) the load on the cutter 120 (e.g., the amount of power required to drive the cutter 120 or a related parameter), the load on the augers 130 (e.g., the amount of power required to drive the augers 130 or a related parameter), and the load on the conditioning system (e.g., the amount of power required to drive the conditioning system 140 or a related parameter).

As the amount of plant material in a given area increases, the load on the header 100 increases. By way of example, the energy and torque required to drive the cutting discs 162 through the plant material, drive the auger 130 to move the plant material toward the center of the header 100, and drive the conditioning system 140 to condition the plant material all increase as the rate at which plant material enters the header 100 increases. Accordingly, an increase in the power consumed to drive the header 100, the torque on the header motors 110, and/or the pressure supplied to the header motors 110 may indicate a corresponding increase in yield. A relationship between (a) the data from the header sensors 328, the cutter sensors 330, the collector sensors 332, and/or the conditioner sensors 334 and (b) the yield may be predetermined (e.g., experimentally) and stored by the control system 300 (e.g., in the memory 364, in the memory 314, etc.).

B. Correction Factors

While the load measurement data provides an indication of yield, the control system 300 may additionally utilize one or more correction factors to further improve the accuracy of the yield determination. The correction factors may account for various conditions that may not be directly identified by the drive sensors 322, the header sensors 328, the cutter sensors 330, the collector sensors 332, and the conditioner sensors 334, but may still affect the yield determination. By way of example, the correction factors may be predetermined, based on user inputs (e.g., through the operator interface 40), and/or based on sensor data. The relationship between each correction factor and the yield may be predetermined (e.g., experimentally) and stored by the control system 300 (e.g., in the memory 364, in the memory 314, etc.).

In some embodiments, the yield is calculated based on information from the location sensors 320. In some such embodiments, yield is calculated based on the ground speed of the vehicle 10 (i.e., the speed at which the vehicle 10 moves relative to the ground). By way of example, as the ground speed of the vehicle 10 increases, the rate at which plant material enters the header 100 may increase. Accordingly, the amount of power required to propel the vehicle 10 may increase (e.g., due to the increased resistance from additional plant material), and the amount of power required to drive the header 100 may increase (e.g., due to the header 100 processing a greater amount of plant material in a given amount of time). Accordingly, the correction factor based on ground speed may reduce the calculated yield as the ground speed increases to account for increased loading of the header motors 110 and the wheel motors 72.

Additionally or alternatively, the yield may be calculated based on the location of the vehicle 10 (e.g., as provided by the location sensors 320). By way of example, the topography of the field may include changes in elevation. When ascending, the power and force required to propel the vehicle 10 may increase. Similarly, when descending, the power and force required to propel the vehicle 10 may decrease. The location sensors 320 may provide an indication of whether the vehicle 10 is ascending or descending, and the severity of the change in elevation. By way of example, the location sensor 320 may measure the elevation of the vehicle 10 directly. By way of another example, the topography of a field may be predetermined, and the control system 300 may compare data from the location sensor 320 with the predetermined topographical map of the field to determine the current change in elevation. The correction factor based on the location of the vehicle may reduce the calculated yield as the vehicle 10 is ascending to account for the increased loading of the wheel motors 72 due to the ascent.

In some embodiments, the yield is calculated based on an operating speed of the header 100. The operating speed of the header 100 indicates how quickly the cutting discs 162, the auger 130, and the rollers 180, 182 rotate. The operating speed of the header 100 may vary based on, for example, the flow rate of fluid supplied to the header motors 110. The operating speed of the header 100 may be sensed (e.g., by measuring the flow rate of the fluid supplied to the header motors 110). The operating speed of the header 100 may be determined based on a current setting of the vehicle 10 (e.g., a header speed setting provided as an input by the operator to the operator interface 40). The correction factor based on the operating speed of the header 100 may reduce or increase the calculated yield based on the determined operating speed of the header 100.

In some embodiments, the yield is calculated based on a sensed speed of one of the rollers 180, 182. By way of example, the bottom roller 182 may be driven by the header motors 110, and the top roller 180 may be free spinning. In such an embodiments, the speed of the top roller 180 may indicate a speed at which plant material passes through the conditioning system 140. A rotational speed of this top roller 180 may be sensed by one of the conditioner sensors 334. The correction factor based on the rotational speed of the top roller 180 and/or the bottom roller 182 may reduce or increase the calculated yield based on the determined rotational speed.

In some embodiments, the yield is calculated based on a specification of the header 100, such as a width of the header 100. The vehicle 10 may be compatible with multiple different sizes of header 100. As the width of the header 100 increases, a wider row of plant material is permitted to enter the header 100, and amount of plant material that enters the header 100 increases. This increases the power required to propel the vehicle 10 and to drive the header 100, but also increases the amount of plant material that is harvested in a given pass. The width of the header 100 may be selected by a user (e.g., through the operator interface 40). The correction factor based on the width of the header 100 may reduce or increase the calculated yield based on the selected width of the header 100.

In some embodiments, the yield is calculated based on a current setting of the header 100. The header 100 may include one or more features that are adjustable to customize operation of the header 100. The settings may be manually adjusted (e.g., by turning a crank or removing a fastener, etc.) or automatically adjusted by one or more actuators. The current setting may be manually reported by a user (e.g., as an input to the operator interface 40) or sensed (e.g., by a position sensor, by a force sensor, etc.).

In some embodiments, the setting includes a distance between the top roller 180 and the bottom roller 182 (i.e., a roll gap) of the conditioning system 140. Reducing the roll gap may increase the power required to move plant material through the header 100. Accordingly, a correction factor based on the roll gap of the header 100 may reduce the calculated yield as the roll gap decreases to account for the increased difficulty of passing plant material through the conditioning system 140.

In some embodiments, the setting includes a biasing force between the top roller 180 and the bottom roller 182 of the conditioning system 140. By way of example, a spring tension may bias the rollers 180, 182 together, and the spring tension may be adjusted. Increasing the biasing force may increase the power required to move plant material through the header 100. Accordingly, a correction factor based on the biasing force may reduce the calculated yield as the biasing force increases to account for the increased difficulty of passing plant material through the conditioning system 140.

In some embodiments, the yield is calculated based on a position of a component of the header 100. In some such embodiments, the yield is calculated based on a position of the housing 150 (e.g., relative to the frame 12, relative to the ground, etc.). The position of the housing 150 may represent a position of the overall header 100. This position may be provided by the header position sensors 336. As the header 100 moves closer to the ground, the plant is severed closer to the ground, and a larger portion of the plant is fed through the header 100. Accordingly, lowering the header 100 may result in an increase in power required to drive the header 100. Depending upon the crop being harvested, lowering the header 100 may also increase the crop yield. The correction factor based on the position of the housing 150 of the header 100 may reduce or increase the calculated yield based on the determined position.

Additionally or alternatively, the yield may be calculated based on a position of the swathe baffle 190 (e.g., relative to the housing 150). This position may be provided by the baffle position sensors 338. As the swathe baffle 190 is lowered, the swathe baffle 190 enters the path of the plant material and more severely deflects the plant material toward the ground. Accordingly, lowering the swathe baffle 190 may increase the amount of power required to drive the header 100. The correction factor based on the position of the swathe baffle 190 of the header 100 may reduce the calculated yield in response to lowering the swathe baffle 190.

In some embodiments, the yield is calculated based on an amount of force applied to the swathe baffle 190. As the flow rate of plant material through the header 100 increases, the force of the plant material contacting the swathe baffle 190 increase. In some embodiments, this force is measured (e.g., using a strain gauge, based on a force applied by an actuator that positions the swathe baffle 190 relative to the housing 150, etc.). A correction factor based on the force on the swathe baffle 190 may increase the calculated yield as the force on the swathe baffle 190 increases (e.g., based on an experimentally-determined relationship between yield and the force on the swathe baffle 190).

In some embodiments, the yield is calculated based on a characteristic of the crop that is being harvested. By way of example, the yield may be calculated based on the type of crop that is being harvested (e.g., hay, alfalfa, legumes, etc.). Different types of crop may require different amounts of power to cut, collect, and/or condition. The type of crop being harvested may be provided by an operator (e.g., through the operator interface 40). A correction factor based on the type of crop being harvested may reduce or increase the calculated yield (e.g., based on an experimentally-determined relationship between yield and the load imparted on the header 100 by various crops).

By way of another example, the yield may be calculated based on a growth stage of a crop that is being harvested. The amount of power required to cut, collect, and/or condition the crop may vary throughout the growing cycle of the plant. A user may decide to harvest a crop earlier or later in the growing cycle (e.g., due to the timing of favorable weather conditions for harvesting, etc.). The growth stage of the crop may be provided by an operator (e.g., through the operator interface 40). A correction factor based on the current growth stage of the crop may reduce or increase the calculated yield (e.g., based on an experimentally-determined relationship between yield and the load imparted on the header 100 by the crop at different growth stages).

By way of another example, the yield may be calculated based on a cutting number of a crop that is being harvested. Certain crops can be grown and harvested multiple times throughout a growing season. Different cuttings may have different properties (e.g., densities, fully-grown heights, etc.). By way of example, the first cutting may have unique properties that are different from subsequent cuttings. Accordingly, the cutting number of the crop may vary the amount of power required to drive the header 100. The cutting number of the crop may be provided by an operator (e.g., through the operator interface 40). A correction factor based on the cutting number of the crop may reduce or increase the calculated yield (e.g., based on an experimentally-determined relationship between yield and the cutting number).

By way of another example, the yield may be calculated based on a moisture content of the crop that is being harvested. Moisture content may change based on various factors (e.g., growth stage, the amount of precipitation received by the field, etc.). Plant material having a higher moisture content may increase the load on the header 100, such that a larger amount of power is required to drive the header 100. The moisture content of the crop may be provided by an operator (e.g., through the operator interface 40) and/or measured using one or more sensors. A correction factor based on the moisture content of the crop may reduce or increase the calculated yield (e.g., based on an experimentally-determined relationship between yield and the moisture content).

By way of another example, the yield may be calculated based on an effective header width of the header 100. The effective header width may represent a portion of the header 100 that is actively harvesting plant material. By way of example, a header 100 may have a header width (e.g., measured laterally, perpendicular to the direction of movement of the vehicle 10) of 10 feet. If the section of plant material entering the header 100 is at least 10 feet wide, the entire width of the header 100 will be utilized to harvest the plant material, and the effective header width will be 10 feet or 100% of the header width. If the section of plant material entering the header 100 is 8 feet wide, only 8 feet of the header 100 will be utilized to harvest the plant material, and the effective header width will be 8 feet or 80% of the header width. An effective header width of less than 100% of the header width will reduce the load on the header 100. A correction factor based on the effective header width may reduce or increase the calculated yield (e.g., based on an experimentally-determined relationship between yield and the effective header width).

In some embodiments, the effective header width is measured by a sensor (e.g., a crop width sensor provides crop width data). By way of example, the cameras 340 may capture image data of an area forward of the header 100. The area may include a section of plant material that is about to enter the header 100. The vehicle controller 310 may perform image recognition on the image data (e.g., based on a predetermined relationship between an amount of pixels and a real-world distance) to determine a width of the section of plant material about to enter the header 100.

In some embodiments, the effective header width is determined based on the location of the vehicle 10 (e.g., as provided by the location sensors 320). By way of example, the vehicle controller 310 may record a navigation path of the vehicle 10 as the vehicle 10 moves throughout the field. Based on the navigation path and a predetermined width of the header 100, the vehicle controller 310 may determine which areas of the field have been harvested and which areas of the field have not yet been harvested. Using the current location and/or movement direction of the vehicle 10, the vehicle controller 310 may determine an area of the field that the header 100 is currently attempting to harvest. The vehicle controller 310 may compare the area of the field that the header 100 is currently attempting to harvest with the areas of the field have or have not been harvested to determine the width of the section of the plant material that is entering the header.

C. Use of Calculated Yield

As the vehicle 10 operates, the control system 300 may periodically retrieve data to calculate a crop yield at multiple locations throughout a field. The control system 300 associates each calculated yield with the corresponding location where the plant material is harvested. In order to determine this location, the control system 300 may utilize data from the location sensors 320. The location and calculated yield pairs may be stored by the control system 300 (e.g., in the memory 314, in the memory 364, in the memory 374, etc.). The control system 300 may then use these data pairs to generate a yield map of the field outlining areas of relatively high and low yields.

Figure 8:
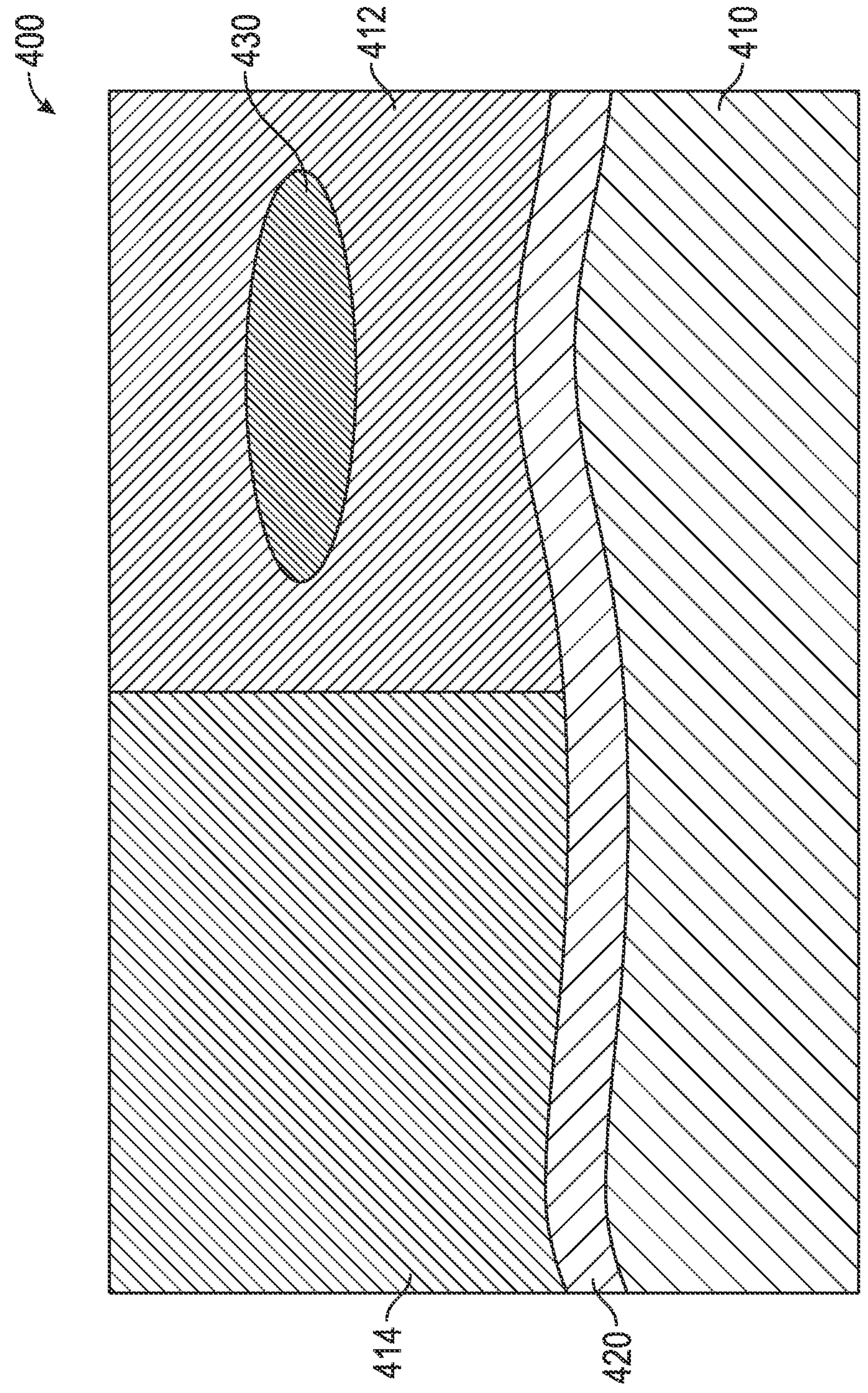
FIG. 8 is a screenshot of a yield map generated by the control system of FIG. 7, according to an exemplary embodiment.

Referring to FIG. 8, a yield map 400 is shown according to an exemplary embodiment. The yield map 400 may be provided to a user as part of a graphical user interface (GUI) (e.g., displayed on the operator interface 40, displayed on the user interface 376, etc.). The yield map 400 includes a series of areas or zones, each associated with a different crop yield. The yield map 400 may visually indicate the yield of each zone. By way of example, a color scale (e.g., from green to red) may indicate the relative yield of each zone. By way of another example, the calculated yield may be indicated numerically. Based on a visual inspection of the yield map 400, a farmer may quickly and easily identify areas of high and low yield, as well as the relative differences in yield (e.g., areas of extremely low or extremely high yield).

As shown, the yield map 400 includes zones 410, 412, 414, each having a different yield. For example, the zone 410 may be a high yield area (e.g., having the highest yield of the three zones). The zone 412 may be a low yield area (e.g., having the lowest yield of the three zones). The zone 414 may be an intermediate yield area (e.g., having a greater yield than the zone 412 but a lesser yield than the zone 410. The yield map 400 illustrates a first obstruction, shown as road 420, and a second obstruction, shown as pond 430. The road 420 and the pond 430 may represent areas where no plant material is harvested. The locations, shapes, and sizes of obstacles, such as the road 420 and the pond 430, may be predetermined and stored by the control system 300.

In some embodiments, the control system 300 provides recommendations for conditioning the soil based on the yield map in order to improve crop yields and/or reduce costs. By way of example, crop yield may be increased by supplying fertilizer to a low yield area. By way of another example, some areas may have a relatively high yield even without the application of fertilizer. By way of another example, crop yield may be increased by providing more or less water to a low yield area.

The control system 300 may examine the yield map and identify areas of relatively low yield. In some embodiments, the control system 300 provides a recommendation to increase the amount of fertilizer and/or water supplied to the low yield areas. Additionally or alternatively, the control system 300 may examine the yield map and identify areas of relatively high yield. In some embodiments, the control system 300 provides a recommendation to decrease the amount of water and/or fertilizer supplied to the high yield areas to reduce cost.

The control system 300 may examine the yield map and recommend routes for the vehicle 10 or other vehicles (e.g., balers) to navigate through the field. By way of example, the locations of the windrows may be recorded when cutting the crop and used to generate target paths for the balers that will collect the plant material. By way of another example, balers may need to make additional passes or spend additional time collecting material in high yield areas relative to low yield areas.

The control system 300 may identify a potential cause of the low or high yield in a given area. By way of example, the control system 300 may utilize a topographical map of a field, as well as a historical record for precipitation in the area of the field (e.g., as retrieved from the Internet) to determine a recommendation for increasing crop yield. The control system 300 may check to see if the area has received a significant amount of precipitation (e.g., above a threshold amount of precipitation in a given time period). If so, the control system 300 may determine if any of the low yield areas correspond to areas of low elevation. If so, the control system 300 may determine that the low yield in those areas is caused in part by excessive hydration of the soil due to pooling of rainwater in low elevation areas. In response to such a determination, the control system 300 may provide a recommendation to (a) reduce the water applied to that area (e.g., to reduce the excessive hydration) and/or (b) reduce the amount of fertilizer applied to that area (e.g., because the reduction in yield is not caused by insufficient nutrients in the soil).

In some embodiments, the control system 300 provides one or more harvesting predictions based on the yield map. The predictions may apply to the current crop (e.g., the crop being harvested by the vehicle 10 to produce the current data) or future crops. Based on the yield map, the control system 300 may predict the amount of plant material that will be harvested in a given field. The control system 300 may utilize the predicted amount of harvested plant material to predict the amount of resources required to farm (e.g., plant, spray, harvest, transport, process, and/or store) the plant material. By way of example, the resources may include a predicted amount of seed required to plant the field, a predicted amount of fertilizer, water, and/or pesticide required to maintain the field, a predicted number of vehicles 10 required to harvest the plant material (e.g., within a given span of time), a predicted amount of vehicles required to collect (e.g., bale) the plant material, a predicted amount of vehicles required to transport the plant material, and/or a predicted storage capacity required to store the plant material. The control system 300 may utilize the predicted amount of harvested plant material to predict an amount of revenue that will be gained by selling the plant material (e.g., based on current market prices). Based on the cost of the predicted resources required to farm the plant material and the predicted revenue, the control system 300 may determine a predicted profit for farming the field. The control system 300 may present some or all of this information to a user (e.g., through the operator interface 40 and/or the user interface 376). A farmer may utilize these predictions to plan for the amount of resources they will need for a given growing season. Additionally or alternatively, a farmer may utilize these predictions to strategize which crops to plant in which fields to maximize profitability.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the header 100, the control system 300, etc.) as shown in the various exemplary embodiments is illustrative only. Additionally, any element disclosed in one embodiment may be incorporated or utilized with any other embodiment disclosed herein.

What is claimed is:

1. A method of determining a crop yield of a field harvested by a windrower, the method comprising:
- receiving, from a header sensor, header data indicative of a load experienced by a header of the windrower, the header including a cutter configured to cut plant material and a conditioning system configured to condition the plant material;
- receiving, from a location sensor, location data indicative of a location of the windrower;
- determining the crop yield at the location of the windrower based on the header data and the location data;
- generating at least one correction factor using one or more operating parameters that control operation of the conditioning system when conditioning the plant material; and
- adjusting the determined crop yield based on the at least one correction factor generated using the one or more operating parameters.

2. The method of claim 1, wherein the conditioning system includes a first roller and a second roller spaced apart from one another to form a roller gap through which the plant material passes, the method further comprising:
- generating the at least one correction factor based on a size of the roller gap.

3. The method of claim 1, wherein the conditioning system includes a roller that is biased into contact with the plant material by a biasing force, the method further comprising:
- generating the at least one correction factor based on a magnitude of the biasing force.

4. The method of claim 1, wherein the conditioning system includes a roller that contacts the plant material as the plant material passes through the conditioning system, the method further comprising:
- receiving, from a conditioner sensor, a rotational speed of the roller;
- generating the at least one correction factor based on the rotational speed of the roller.

5. The method of claim 1, wherein the header data indicative of the load experienced by the header include at least one of (a) a power required to drive the header, (b) a torque on a component of the header, or (c) a pressure of a fluid supplied to the header.

6. The method of claim 1, wherein the header includes a header motor that drives both the cutter and the conditioning system, and wherein the header data indicate a load on the header motor.

7. The method of claim 1, wherein the header data indicate at least one of (a) a load on the cutter, (b) a load on the conditioning system, or (c) a load on an auger that draws the cut plant material toward the conditioning system.

8. The method of claim 1, wherein the header sensor is a first header sensor coupled to an auger and the header data is first header data, the method further comprising:
- receiving, from a second header sensor coupled to the cutter, second header data indicative of a power required to drive the cutter;
- receiving, from a third header sensor coupled to the conditioning system, third header data indicative of a power required to drive the conditioning system; and
- determining the crop yield at the location of the windrower based on the first header data, the second header data, and the third header data.

9. The method of claim 1, further comprising:
- receiving, from a drive sensor, drive data indicative of a load on a motor configured to drive at least one tractive element of the windrower to propel the windrower; and
- determining the crop yield at the location of the windrower based on the header data and the drive data.

10. The method of claim 1, further comprising:
- receiving, from the location sensor, at least one of a ground speed of the windrower or the location of the windrower;
- generating, based on the at least one of the ground speed of the windrower or the location of the windrower, at least one second correction factor; and
- adjusting the determined crop yield based on the at least one correction factor and the at least one second correction factor.

11. The method of claim 10, wherein the at least one of the ground speed of the windrower or the location of the windrower includes an elevation of the windrower, and wherein the at least one second correction factor is generated based on whether the elevation of the windrower is increasing or decreasing.

12. The method of claim 1, further comprising:
- determining an effective header width based on at least one of (a) the location data from the location sensor or (b) crop width data from a crop width sensor, the effective header width indicating a width of a section of plant material entering the header;
- generating, based on the effective header width, at least one second correction factor; and
- adjusting the determined crop yield based on the at least one correction factor and the at least one second correction factor.

13. The method of claim 1, further comprising:

receiving, through a user interface, at least one characteristic of a crop that is being harvested, the at least one characteristic including at least one of a type of the crop that is being harvested, a growth stage of the crop that is being harvested, a cutting number of the crop that is being harvested, or a moisture content of the crop that is being harvested;

generating, based on the at least one characteristic, at least one second correction factor; and adjusting the determined crop yield based on the at least one correction factor and the at least one second correction factor.

14. The method of claim 1, wherein the header data are first header data, the location data are first location data, and the location is a first location, the method further comprising:

receiving, from the header sensor and the location sensor, second header data and second location data corresponding to a second location of the windrower;

determining the crop yield at the second location of the windrower based on the second header data and the second location data;

identifying, based on the determined crop yield at the first location and the second location, a low yield area within the field; and providing, through a user interface, a location of the low yield area and a recommendation for modifying a soil condition in the low yield area to increase the crop yield.

15. The method of claim 1, further comprising:

predicting, based on the determined crop yield, an amount of resources required to farm a crop in the field;

predicting, based on the determined crop yield, an amount of the crop that can be harvested from the field; and providing, through a user interface, the amount of the resources required and the amount of the crop that can be harvested.

16. The method of claim 1, wherein the header data are first header data, the location data are first location data, and the location is a first location, the method further comprising:

receiving, from the header sensor and the location sensor, second header data and second location data corresponding to a second location of the windrower;

determining the crop yield at the second location of the windrower based on the second header data and the second location data; and generating, based on the determined crop yield, a graphical user interface including a yield map that illustrates the determined crop yield at the first location and the second location.

17. The method of claim 1, wherein the header data indicate an operating speed of at least one of the cutter or the conditioning system.

18. The method of claim 1, wherein the crop yield at the location indicates at least one of (a) an absolute amount of the plant material harvested at the location or (b) a relative amount of the plant material harvested at the location based on a comparison with a crop yield at another location.

19. A non-transitory computer-readable medium having instructions stored thereon that, when executed by one or more processors, cause the one or more processors to implement operations comprising:

receiving, from a mower sensor, mower data indicative of an overall load on a mower of a windrower, the mower including a cutter configured to cut plant material, an auger configured to collect plant material, and a conditioning system configured to condition the plant material;

receiving, from a drive sensor, drive data indicative of a load on a drive motor configured to propel the windrower;

receiving, from a location sensor, location data indicative of a location of the windrower;

receiving, from a user interface, a user input describing at least one of a configuration of the windrower or a characteristic of a crop being harvested by the windrower;

determining, based on the mower data and the drive data, a crop yield of the crop being harvested by the windrower;

generating at least one correction factor using one or more operating parameters that control operation of the conditioning system when conditioning the plant material;

adjusting the determined crop yield based on the user input and the at least one correction factor generated using the one or more operating parameters; and generating a yield map of a field based on the adjusted crop yield and the location data.

20. A farming system comprising:

a windrower including:

a chassis;

a tractive element coupled to the chassis;

a drive motor configured to drive the tractive element to propel the windrower;

a drive sensor configured to provide drive data indicative of a load on the drive motor;

a header coupled to the chassis, the header including:

a rotating disc configured to cut plant material;

an auger configured to collect the plant material;

a conditioning system comprising at least a roller configured to condition the plant material; and a header motor configured to drive the rotating disc, the auger, and the roller;

a header sensor configured to provide header data indicative of a load on the header motor; and a location sensor configured to provide location data indicative of a current location of the windrower; and a controller operatively coupled to the drive sensor, the header sensor, and the location sensor and configured to:

determine a crop yield at a first location based on the drive data, the header data, and the location data;

determine a crop yield at a second location based on the drive data, the header data, and the location data;

generate at least one correction factor using one or more operating parameters that control operation of the conditioning system when conditioning the plant material; and adjust at least one of the determined crop yield at the first location or the second location based on the at least one correction factor generated using the one or more operating parameters.

* * * * *